United States Patent
Dickerson et al.

(10) Patent No.: US 7,610,288 B2
(45) Date of Patent: Oct. 27, 2009

(54) PERFORMANCE MANAGEMENT SYSTEM AND METHOD

(75) Inventors: Stephanie Dickerson, Lawrenceville, GA (US); John Holt, Lawrenceville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 650 days.

(21) Appl. No.: 10/337,585

(22) Filed: Jan. 7, 2003

(65) Prior Publication Data

US 2004/0133578 A1 Jul. 8, 2004

(51) Int. Cl.
*G06F 7/00* (2006.01)
(52) U.S. Cl. .............................. 707/10; 707/1; 707/101; 707/102; 707/104.1; 705/1; 705/7; 705/11; 705/36
(58) Field of Classification Search ................ 707/2–8, 707/10–104.1; 709/219–229; 705/12, 14, 705/11, 35, 7, 1, 400, 36; 379/9, 266.06
See application file for complete search history.

(56) References Cited

U.S. PATENT DOCUMENTS

| | | | | |
|---|---|---|---|---|
| 5,289,368 A * | 2/1994 | Jordan et al. .................. | 705/10 |
| 5,911,134 A * | 6/1999 | Castonguay et al. ........... | 705/9 |
| 5,926,794 A * | 7/1999 | Fethe ........................... | 705/11 |
| 5,953,389 A * | 9/1999 | Pruett et al. .................... | 379/9 |
| 5,978,648 A * | 11/1999 | George et al. ................ | 434/362 |
| 6,014,134 A * | 1/2000 | Bell et al. .................... | 715/705 |
| 6,049,779 A * | 4/2000 | Berkson ........................ | 705/1 |
| 6,094,655 A * | 7/2000 | Rogers et al. ................. | 707/10 |
| 6,209,029 B1 * | 3/2001 | Epstein et al. ............... | 709/219 |
| 6,310,945 B1 | 10/2001 | Bailis | |
| 6,343,332 B1 | 1/2002 | Ueda | |
| 6,442,552 B1 * | 8/2002 | Frolund et al. ................. | 707/10 |
| 6,523,043 B1 * | 2/2003 | Miranda et al. ............. | 707/102 |
| 6,556,974 B1 * | 4/2003 | D'Alessandro ............... | 705/10 |
| 6,567,784 B2 * | 5/2003 | Bukow .......................... | 705/9 |
| 6,581,062 B1 * | 6/2003 | Draper et al. ............... | 707/100 |
| 6,694,374 B1 * | 2/2004 | McGloin et al. ............. | 709/238 |
| 6,754,874 B1 * | 6/2004 | Richman ..................... | 715/205 |
| 6,768,994 B1 * | 7/2004 | Howard et al. ................. | 707/10 |
| 6,779,025 B1 * | 8/2004 | Wolfe et al. .................. | 709/219 |
| 6,782,093 B2 * | 8/2004 | Uckun ................... | 379/266.06 |
| 6,938,048 B1 * | 8/2005 | Jilk et al. ...................... | 705/11 |

(Continued)

OTHER PUBLICATIONS

An XML-based Matadata Repository for NASA Standards Advisor—Bindumadhuri Arla—Tuscaloosa, Alabama—2003 cs.ua.edu (pp. 1-72).*

(Continued)

*Primary Examiner*—Jean B Fleurantin
*Assistant Examiner*—Anh Ly
(74) *Attorney, Agent, or Firm*—Fay Kaplun & Marcin, LLP

(57) ABSTRACT

A performance management system is disclosed. The performance management system includes a host system in communication with a client system. The host system includes a database server and an application server. The database server is configured to receive workplace performance information from one or more sources. The application server is configured to receive a query from the client system to provide workplace performance information, transmit a request to the database server to provide workplace performance information, receive workplace performance information transmitted from the database server, generate an HTML document that includes workplace performance information, and transmit the HTML document to the client system.

18 Claims, 2 Drawing Sheets

U.S. PATENT DOCUMENTS

| | | | |
|---|---|---|---|
| 6,944,596 B1* | 9/2005 | Gray et al. | 705/1 |
| 6,996,517 B1* | 2/2006 | Papaefstathiou | 703/22 |
| 7,093,748 B1* | 8/2006 | Matsko et al. | 705/11 |
| 7,184,962 B2* | 2/2007 | Kalnas et al. | 705/1 |
| 7,222,086 B2* | 5/2007 | Huffman | 705/11 |
| 7,281,206 B2* | 10/2007 | Schnelle et al. | 715/227 |
| 2002/0004191 A1* | 1/2002 | Tice et al. | 434/350 |
| 2002/0019765 A1* | 2/2002 | Mann et al. | 705/11 |
| 2002/0026338 A1* | 2/2002 | Bukow | 705/7 |
| 2002/0111889 A1* | 8/2002 | Buxton et al. | 705/35 |
| 2002/0133394 A1* | 9/2002 | Bushey et al. | 705/10 |
| 2002/0184085 A1* | 12/2002 | Lindia et al. | 705/11 |
| 2002/0196270 A1* | 12/2002 | Sirhall | 345/733 |
| 2003/0002653 A1* | 1/2003 | Uckun | 379/266.06 |
| 2003/0009742 A1* | 1/2003 | Bass et al. | 717/104 |
| 2003/0050830 A1* | 3/2003 | Troyer | 705/11 |
| 2003/0101091 A1* | 5/2003 | Levin et al. | 705/11 |
| 2003/0105657 A1* | 6/2003 | Nandigama et al. | 705/9 |
| 2003/0140021 A1* | 7/2003 | Ryan et al. | 706/16 |
| 2003/0177203 A1* | 9/2003 | Crook | 709/219 |
| 2003/0200136 A1* | 10/2003 | Dewar | 705/11 |
| 2003/0225877 A1* | 12/2003 | Packman et al. | 709/224 |
| 2004/0088177 A1* | 5/2004 | Travis et al. | 705/1 |
| 2004/0128188 A1* | 7/2004 | Leither et al. | 705/11 |
| 2004/0138944 A1* | 7/2004 | Whitacre et al. | 705/11 |
| 2004/0243607 A1* | 12/2004 | Tummalapalli | 707/100 |
| 2005/0037326 A1* | 2/2005 | Kuntz et al. | 434/353 |
| 2005/0065837 A1* | 3/2005 | Kosiba et al. | 705/9 |
| 2005/0119922 A1* | 6/2005 | Eder | 705/7 |
| 2005/0131732 A1* | 6/2005 | Potenza | 705/1 |
| 2005/0233296 A1* | 10/2005 | Ziv-el et al. | 434/350 |
| 2006/0078863 A1* | 4/2006 | Coleman et al. | 434/322 |

OTHER PUBLICATIONS

Organizational psychology and performance in IS employment outsourcing and Insourcing—Soon Ang & Sandra A. Slaughter—System Science, 1998, proceedings of the thirty-first Hawaii International conference: Jan. 6-9, 1998, vol. 6 (pp. 635-643).*

"A New View of IS Personnel Performance Evaluation"—James J. Jiang, Marion G. Sobol & Gary Klein— Communications of the ACM—vol. 44, issue 6 Jun. 2001, (pp. 95-102).*

* cited by examiner

US 7,610,288 B2

PERFORMANCE MANAGEMENT SYSTEM AND METHOD

BACKGROUND

The present application is related, generally, to systems and methods for obtaining workplace performance information. Such information may be used to evaluate worker performance. The systems and methods may be applied to a variety of different work environments. By way of example, an application of the systems and methods to a call center environment will be described herein.

A call center may be staffed by a call center manager, one or more assistant managers, and any number of call service administrators. The call service administrators may interact with customers via the telephone and may receive telephone calls via an automatic call distributor. The call service administrators may be responsible for taking product orders for products such as, for example, asymmetric digital subscriber line (ADSL) products, and for resolving customer service issues such as billing adjustments.

Each assistant manager may be responsible for supervising, managing, and evaluating the performance of one or more call service administrators. An assistant manager may evaluate a particular call service administrator based on a number of different criteria. For example, the evaluation may be based on how quickly a service order error was corrected by the call service administrator, how many product orders were processed by the call service administrator, how many of the processed orders were completed, rejected, or canceled, and on automatic call distribution information associated with the call service administrator. Such automatic call distribution information may include the number of calls taken by the call service administrator, the average length of each call, the amount of time the call service administrator was available to take a call, the amount of time the call service administrator was idle, etc. The call center manager may be responsible for managing the day-to-day operations of the call center, including the management and evaluation of the assistant managers.

In a complex operation such as a call center, the information used by the assistant managers to evaluate the call service administrators may need to be obtained from a variety of different sources. In many call centers, the procurement of the information consumes an inordinate amount of time because for each different source of information, the assistant managers may have to perform one or more separate operations to obtain the information.

SUMMARY

In one general respect, the present invention is directed to a performance management system. According to one embodiment, the performance management system includes a client system, and a host system in communication with the client system. The host system includes a database server and an application server. The database server is configured to receive information from one or more sources. The application server is configured to receive a query from the client system to provide workplace performance information, transmit a request to the database server to provide workplace performance information, receive workplace performance information transmitted from the database server, generate an HTML document that includes workplace performance information, and transmit the HTML document to the client system.

In another general respect, the present invention is directed to a method for obtaining workplace performance information. According to one embodiment, the method includes, at a database server, receiving workplace performance information from one or more sources, processing the workplace performance information, and transmitting the workplace performance information in response to a request received from an application server.

According to another embodiment, the method includes, at an application server, receiving workplace performance information, generating an HTML document that includes workplace performance information, and transmitting the HTML document in response to a request received from a client system.

According to another embodiment, the method includes, at a client system, initiating as request for workplace performance information, receiving an HTML document that includes workplace performance information, translating the HTML document to another format, and displaying the translated HTML document.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
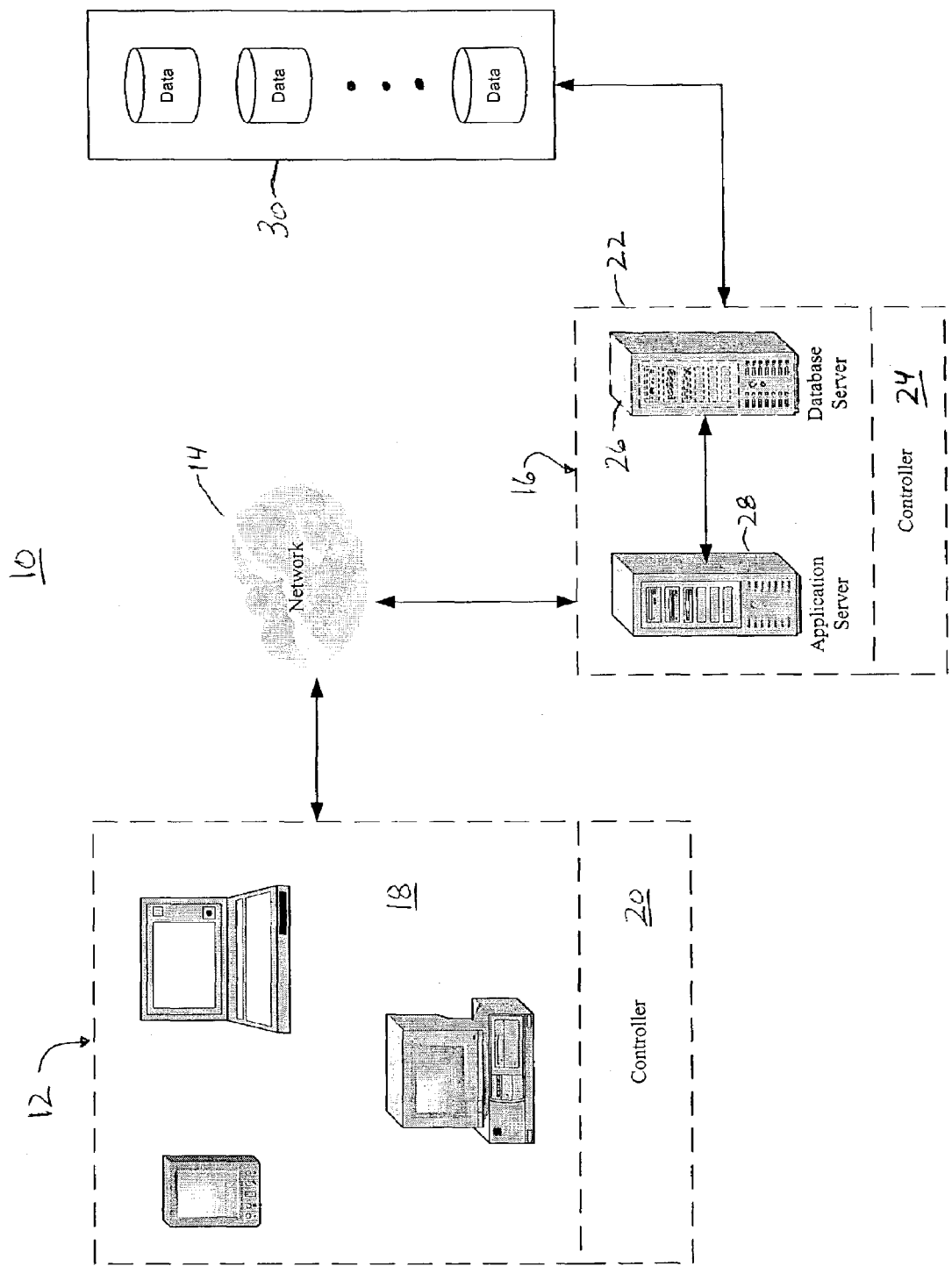
FIG. 1 illustrates one embodiment of a performance management system.

FIG. 1 illustrates one embodiment of a performance management system 10. The performance management system 10 may include a client system 12, a network 14, and a host system 16. The client system 12 and the host system 16 may be configured to communicate and exchange information with one another via the network 14. The performance management system 10 may be used to obtain workplace performance information, and such information may be used to evaluate one or more workers.

In general, the client system 12 may include a computer system having hardware and/or software components for communicating with the network 14 and the host system 16. The client system 12 may include one or more general-purpose computers (e.g., personal computers and/or servers), one or more special-purpose computers (e.g., devices specifically programmed to communicate with each other), or a combination of one or more general-purpose computers and one or more special-purpose computers. The client system 12 may be structured and arranged to communicate using various communication protocols (e.g., HTTP, TCP/IP, WAP, UDP) to establish connections between network elements and/or to operate within or in concert with one or more other systems such as, for example, the Internet and/or the World Wide Web (Web).

In one embodiment, the client system 12 may be implemented as a client device 18 operating under the command of a client controller 20. The broken lines shown surrounding the client controller 20 in FIG. 1 are intended to indicate that in some embodiments, the client controller 20, or portions thereof considered collectively, may instruct one or more elements of the client device 18 to operate as described.

According to one embodiment, the client device 18 may be implemented as a general-purpose computer capable of responding to and executing instructions in a defined manner. According to other embodiments, the client device 18 may be implemented as a special-purpose computer, a personal computer (PC), a workstation, a server, a laptop computer, a web-enabled telephone, a web-enabled personal digital assistant (PDA), a microprocessor, an integrated circuit, or any other component, machine, tool, equipment, or some combination thereof capable of responding to and executing instructions.

According to one embodiment, the client controller 20 may be implemented as a software application (e.g., operating system, browser application, client application, server application, proxy application, on-line service provider application, and/or private network application) installed on the client device 18 for directing communications. According to other embodiments, the client controller 20 may be implemented as a computer program, code, set of instructions, or some combination thereof, for independently or collectively instructing the client device 18 to interact and operate as programmed. The client controller 20 may be implemented utilizing any suitable computer language (e.g., Java, Perl, C or C++) and/or object-oriented techniques. According to another embodiment, the client controller 20 also may be implemented as a device, such as a workstation or PC, a microprocessor, a network server, a Java virtual machine, or an application-specific integrated circuit.

The client controller 20 may be embodied permanently or temporarily in any type of machine, component, physical or virtual equipment, storage medium, or propagated signal capable of delivering instructions to the client device 18. In particular, the client controller 20 (e.g., software application, computer program) may be stored on a storage medium (e.g., disk, device, or propagated signal), readable by a computer system, such that if the storage medium is read by the computer system, the functions described herein are performed.

According to one embodiment, the client system 12 may include a personal computer running a browser application. The client system 12 may display various graphical user interfaces (GUIs), such as Web pages, that request input from and deliver content to a user of the performance management system 10. For example, a system user may input requested information into a series of GUIs and then be presented with a display of worker performance information.

The network 14 may include one or more delivery systems for directly or indirectly connecting the client system 12 and the host system 16. Examples of delivery systems include, but are not limited to, a local area network (LAN), a metropolitan area network (MAN), a wide area network (WAN), the Internet, the Web, a telephony network (e.g., analog, digital, wired, wireless, PSTN, ISDN, or xDSL), a radio network, a television network, a cable network, a satellite network, and/or any other wired or wireless communications network configured to carry data. Each network may include one or more elements, such as, for example, intermediate nodes, proxy servers, firewalls, routers, switches, adapters, sockets, and wired or wireless data pathways, configured to direct and/or deliver data.

In general, the host system 16 may include a computer system having hardware and/or software components for communicating with the network 14 and the client system 12. The host system 16 may include one or more general-purpose computers (e.g., personal computers and/or servers), one or more special-purpose computers (e.g., devices specifically programmed to communicate with each other), or a combination of one or more general-purpose computers and one or more special-purpose computers. The host system 16 may be structured and arranged to communicate using various communication protocols (e.g., HTTP, TCP/IP, WAP, UDP) to establish connections between network elements and/or to operate within or in concert with one or more other systems (e.g., the Internet and/or Web). The host system 16 may also include and/or form part of an information delivery network, such as, for example, the Internet, the Web, an on-line service provider, a private network, and/or any other analog or digital wired and/or wireless network that provides information.

In one embodiment, the host system 16 may include a host device 22 operating under the command of a host controller 24. The broken lines shown surrounding the host controller 24 in FIG. 1 are intended to indicate that in some implementations, the host controller 24, or portions thereof considered collectively, may instruct one or more elements of the host device 22 to operate as described. The host device 22 and the host controller 24 may be similar to the client device 18 and client controller 20 described hereinabove. Accordingly, the function of retrieving and displaying/printing workplace performance information may be implemented as software controlling one or more elements of the client system 12 and/or the host system 16.

As shown in FIG. 1, the host device 22 may include a database server 26 and an application server 28. The database server 26 may be in communication with one or more sources of workplace performance information 30. The sources of workplace performance information 30 may be implemented as databases, and each database may be associated with a different computer system. According to one embodiment, the workplace performance information may include, for example, ACD (Automatic Call Distribution) data, SOEG (Service Order Entry Gateway) data, or SOCS (Service Order Correction System) data. ACD data may include, for example, the amount of time a call service administrator was available to accept a telephone call, the number of telephone calls accepted, the average duration of the accepted telephone calls, etc. SOEG data may include, for example, the number of orders processed, the number of orders rejected, the number of orders canceled, the percentage of orders entered correctly, etc. SOCS data may include, for example, the amount of time spent correcting a particular order entry error.

The database server 26 may be configured to serve as a centralized database for all workplace performance information associated with, for example, a particular company or a business unit thereof. According to one embodiment, the database server 26 may be configured to run various software applications such as, for example, data scrubbing applications, data replication applications, and database management applications. The centralized database may comprise a portion of a database management system, and the query language used for defining, maintaining, and viewing the workplace performance information that resides at the centralized database may be a structured query language (SQL).

The application server 28 may be in communication with the database server 26, and may be configured to present the workplace performance information to the client system 12 via the network 14. According to one embodiment, the application server 28 may be configured to run various software applications such as, for example, Web applications. It is to be understood that while the database server 26 and the application server 28 are shown as monolithic structures, each may include numerous elements (e.g., servers, routers, switches, firewalls, sockets, databases, tables, disks, hard drives, etc.) in various embodiments of the host system 16. For example, according to one embodiment, the application server 28 may include and/or form a part of a web server.

Figure 2:
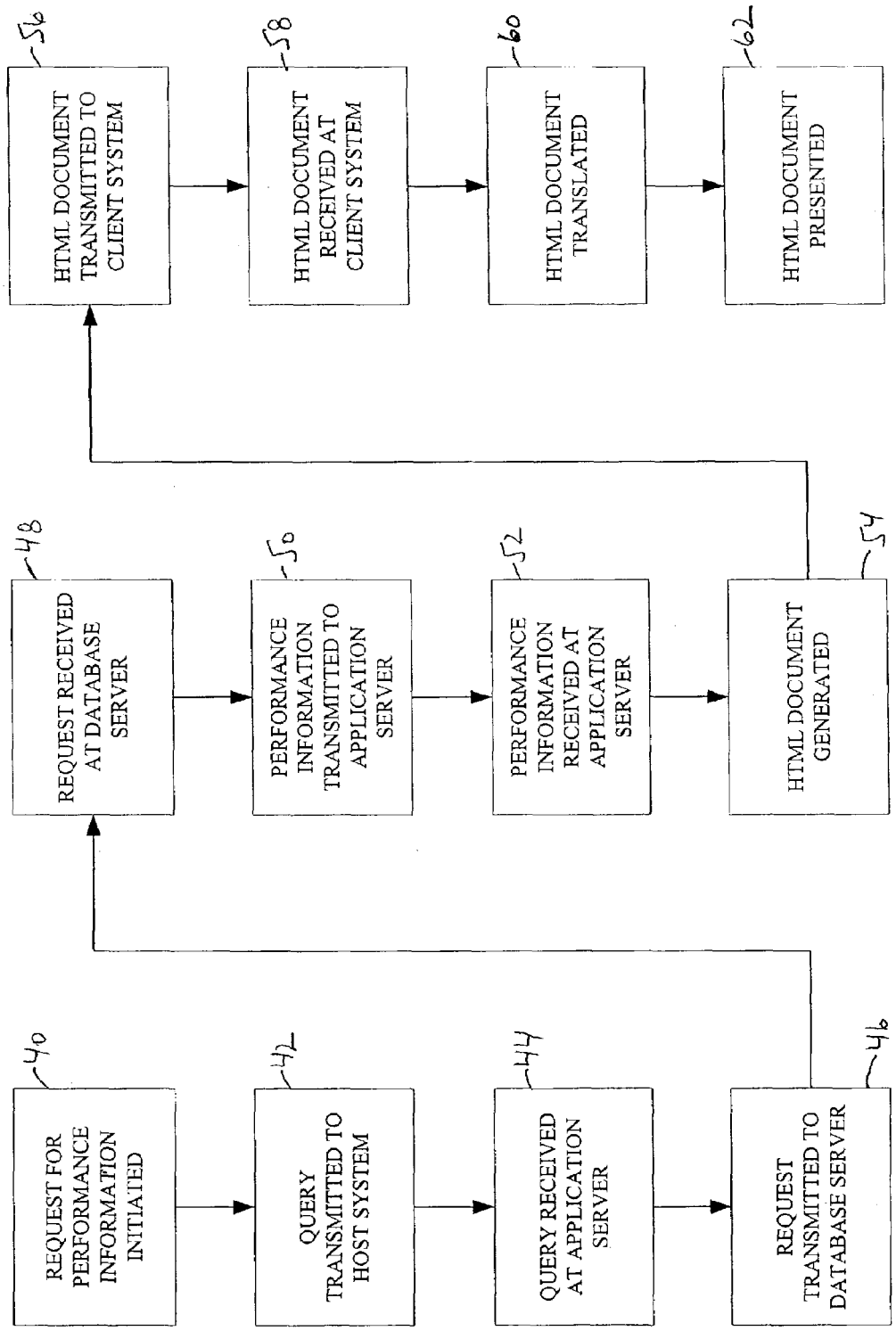
FIG. 2 illustrates one embodiment of a process flow through the performance management system of FIG. 1.

FIG. 2 illustrates one embodiment of a process flow through the performance management system 10 of FIG. 1. According to this embodiment, prior to a user of the performance management system 10 being able to obtain workplace performance information associated with one or more workers, the historical workplace performance information for the one or more workers is captured, then stored at one or more sources of workplace performance information 30 (i.e., databases). According to one embodiment, replication operations may be used to push the workplace performance information stored at each of the databases to the database server 26. According to another embodiment, a query/response operation may be used to pull the workplace performance information from each of the databases to the database server 26. When workplace performance information is received at the database server 26, the workplace performance information becomes part of a centralized database, and is organized into a predetermined format. A data-scrubbing operation may be used to clean up the information received from the different databases. After the workplace performance information is stored at the centralized database, the performance management system 10 may be used to obtain the workplace performance information.

The process flow will be described in the context of a call center, although the performance management system 10 may be used in any number of work environments. The process begins at block 40, where an assistant manager initiates a request for performance information associated with a particular call service administrator. According to one embodiment, the assistant manager may use the client system 12 to initiate the request by first accessing a web site, then by initiating a query for the performance information associated with the call service administrator. The request may be for any period of time such as, for example, the previous shift, the previous day, the previous week, the previous month, the previous year, the current year-to-date, etc. The query may be initiated, for example, via a graphical user interface of the client system 12.

From block 40, the process flow advances to block 42, where the client system 12 transmits the query to the host system 16 via the network 14. From block 42, the process flow advances to block 44, where the application server 28 of the host system 16 receives the query transmitted from the client system 12. From block 44, the process flow advances to block 46, where, in response to the query, the application server 28 transmits a request for the performance information to the database server 26 of the host system 16.

From block 46, the process advances to block 48, where the database server 26 receives the request for the performance information from the application server 28. From block 48, the process flow advances to block 50, where the database server 26 processes the request, and transmits the performance information to the application server 28. According to one embodiment, the performance information may be transmitted in the form of a text file. According to another embodiment, the performance information may be transmitted in the form of a record set.

From block 50, the process flow advances to block 52, where the application server 28 receives the performance information transmitted from the database server 26. From block 52, the process flow advances to block 54, where the application server 28 processes the performance information to generate an HTML document such as, for example, a Web page that includes the performance information requested by the assistant manager at block 40. From block 54, the process flow advances to block 56, where the application server 28 transmits the HTML document to the client system 12 via the network 14.

From block 56, the process flow advances to block 58, where the client system 12 receives the HTML document transmitted from the application server 28. From block 58, the process flow proceeds to block 60, where the client system 12 translates the HTML document to a form suitable for displaying to a user of the performance management system 10. According to one embodiment, a browser application of the client system 12 may translate the HTML document to a form suitable for displaying on a monitor of the client system 12. From block 60, the process flow advances to block 62 where the client system 12 presents the translated HTML document, thereby providing the performance information originally requested at block 40. The translated HTML document may be displayed on a monitor of the client system 12, and may be forwarded to a printer to obtain a hard copy of the translated HTML document.

The assistant manager may use the performance information included in the translated HTML document to evaluate the performance of the particular call service administrator. For example, the assistant manager may compare the performance information associated with the call service administrator to established benchmarks or to the performance information associated with other call service administrators to evaluate the workplace performance of the call service administrator.

While several embodiments of the invention have been described, it should be apparent, however, that various modifications, alterations and adaptations to those embodiments may occur to persons skilled in the art with the attainment of some or all of the advantages of the present invention. For example, although one embodiment describes a request for performance information as a request for performance information for a particular call service administrator, in other embodiments the request may be for the performance information associated with any number of call service administrators. It is therefore intended to cover all such modifications, alterations and adaptations without departing from the scope and spirit of the present invention as defined by the appended claims.

What is claimed is:

1. A method for obtaining workplace performance information about a worker, the method comprising:

receiving, at a database server, workplace performance information about the worker from at least two sources, each of the least two sources supplying a different type of information;

processing, by the database server, the workplace performance information;

transmitting, by the database server, the workplace performance information as at least one signal in response to a request signal received from an application server, receiving, at the application server, the workplace performance information from the database server;

generating, by the application server, an HTML document including the workplace performance information;

transmitting, by the application server, the HTML document in response to a request receiving from a client system;

initiating via a graphical user interface, at the client system, the request for workplace performance information;

receiving, at the client system, the HTML document that includes the workplace performance information;

translating, at the client system, the HTML document to another format;

displaying, at the client system, the translated HTML document;

viewing, by a user, the translated HTML document;

using the workplace performance information included in the HTML document for at least one of the following: evaluating the performance of the worker, and establishing benchmarks for the worker; and wherein receiving workplace performance information includes receiving Service Order Correction System data, and wherein the Service Order Correction System data includes an amount of time spent correcting an order entry error.

2. The method of claim 1, wherein receiving workplace performance information receiving workplace performance information pushed from at least two sources.

3. The method of claim 2, wherein receiving workplace performance information pushed from the at least two sources includes performing a data replication operation.

4. The method of claim 2, wherein receiving workplace performance information pulled from the at least two sources includes performing a query/response operation.

5. The method of claim 1, wherein receiving workplace performance includes receiving workplace performance information pulled from the at least two sources.

6. The method of claim 1, wherein receiving workplace performance information includes receiving a text file.

7. The method of claim 1, wherein receiving workplace performance information includes receiving a record set.

8. The method of claim 1, wherein processing the workplace performance information includes performing a data scrubbing operation.

9. The method of claim 1, wherein processing the workplace performance information includes organizing the workplace performance information into a predetermined format.

10. The method of claim 1, wherein receiving the workplace information includes:

receiving a query transmitted from the client system to provide workplace performance information;

transmitting a request for workplace performance information to the database server; and receiving the workplace information from the database server.

11. The method of claim 1, wherein generating the HTML document includes generating a table.

12. The method of claim 1, wherein generating the HTML document includes generating a bar graph.

13. The method of claim 1, wherein generating the HTML document includes generating a pie chart.

14. The method of claim 1, wherein the database server includes at least one computer-readable medium which contains instructions which, when executed on a computer perform receiving workplace performance information, processing the workplace performance information and transmitting the workplace performance information.

15. A method for obtaining workplace performance information about a worker, the method comprising:

receiving, at a database server, workplace performance information about the worker from at least two sources, each of the at least two sources supplying a different type of information;

processing, by the database server, the workplace performance information; and transmitting, by the database server, the workplace performance information in response to a request received from an application server, receiving, at the application server, the workplace performance information from the database server;

generating, by the application server, an HTML document including the workplace performance information;

transmitting, by the application server, the HTML document in response to a request receiving from a client system;

initiating via a graphical user interface, at the client system, the request for workplace performance information;

receiving, at the client system, the HTML document that includes the workplace performance information;

translating, at the client system, the HTML document to another format;

displaying, at the client system, the translated HTML document;

viewing, by a user, the translated HTML document;

using the workplace performance information included in the HTML document for at least one of the following: evaluating the performance of the worker, and establishing benchmarks for the worker; and wherein receiving workplace performance information as at least one signal includes receiving signal Service Order Entry Gateway data, and wherein the Service Order Entry Gateway data includes at least one of the following: a number of orders processed, a number of orders rejected, a number of orders canceled, and a percentage of orders entered correctly.

16. The method of claim 15, wherein the database server includes at least one computer-readable medium which contains instructions which, when executed on a computer perform receiving workplace performance information, processing the workplace performance information and transmitting the workplace performance information.

17. A method for obtaining workplace performance information about a worker, the method comprising:

receiving, at a database server, workplace performance information about the worker from at least two sources supplying a different type of information;

processing, by the database server, the workplace performance information; and transmitting, by the database server, the workplace performance information as at least one signal in response to a request received from an application server, receiving, at the application server, the workplace performance information from the database server;

generating, by the application server, an HTML document including the workplace performance information;

transmitting, by the application server, the HTML document in response to a request receiving from a client system;

initiating via a graphical user interface, at the client system, the request for workplace performance information;

receiving, at the client system, the HTML document that includes the workplace performance information;

translating, at the client system, the HTML document to another format;

displaying, at the client system, the translated HTML document;

viewing, by a user, the translated HTML document;

using the workplace performance information included in the HTML document for at least one of the following: evaluating the performance of the worker, and establishing benchmarks for the worker; and wherein receiving workplace performance information includes receiving Automatic Call Distribution data, and wherein the Automatic Call Distribution data includes at least one of the following: an amount of time a call service administrator was available to accept a telephone call, a number of telephone calls accepted, and an average duration of accepted telephone calls.

18. The method of claim 17, wherein the database server includes at least one computer-readable medium which contains instructions which, when executed on a computer perform receiving workplace performance information, processing the workplace performance information and transmitting the workplace performance information.

* * * * *